United States Patent Office 2,946,095
Patented July 26, 1960

2,946,095
PROCESS FOR PREPARING POROUS FILMS OF VINYL CHLORIDE POLYMERS

Ludwig A. Beer, Agawam, Mass., assignor to Monsanto Chemical Company, St. Louis, Mo., a corporation of Delaware No Drawing. Filed Apr. 15, 1957, Ser. No. 652,673

4 Claims. (Cl. 18—57)

The present invention relates to methods of preparing porous films from vinyl chloride polymers.

There are many important industrial applications for porous or air-permeable films of vinyl chloride polymers. The presently employed methods for preparing such porous films comprise preparing a non-porous film by conventional techniques and subsequently punching holes in said film by mechanical means.

It is an object of this invention to provide a method for preparing porous films of vinyl chloride polymers.

Another object of this invention is to provide a method for preparing porous films of vinyl chloride polymers that can be readily adapted to continuous production methods.

Other objects and advantages of this invention will be apparent from the following detailed description thereof.

It has been discovered that porous films of vinyl chloride polymers can be prepared by forming a film from a vinyl chloride polymer plastisol or organosol which has incorporated therein a water-aminoplast resin solution or a water-phenoplast resin solution and subsequently heating the film to fuse the vinyl chloride polymer and plasticizer. The resulting product is a continuous plasticized vinyl chloride polymer film having a plurality of small pores or openings therein.

The following examples are set forth to illustrate more clearly the principle and practice of this invention to those skilled in the art. Where parts are mentioned, they are parts by weight.

*Example I*

A plastisol is prepared by dispersing 100 parts of a vinyl chloride homopolymer having an average particle size of 1 micron and 2 parts of a mixed barium and cadmium stabilizer in 60 parts of di(2-ethylhexyl) phthalate. Ten parts of a solution containing 50% water and 50% of a melamine-formaldehyde resin are homogeneously incorporated in 100 parts of the plastisol.

A 15 mil film of the plastisol is coated on a metal plate and the wet film is prefused at 100° C. for 15 minutes then fused by heating for 15 minutes at 165° C. The resulting film is strong, flexible and quite porous as indicated by the fact that 220 ml. of air will pass through 1 square inch of the 15 mil film in 60 seconds in a Gurley porosity tester (ASTM Method D726–4A, Technical Association of Pulp and Paper Industry Standard Method T1460M–49).

*Example II*

Example I is repeated except that 10 parts of a solution containing 50% water and 50% of a urea-formaldehyde resin are incorporated in 100 parts of the plastisol. Essentially comparable results are obtained.

*Example III*

Example I is repeated except that 10 parts of a solution of 35% water and 65% of a phenol-formaldehyde resin are incorporated in 100 parts of the plastisol. A porous film is obtained in which 220 ml. of air will pass through a 1 square inch section of the 15 mil film in 490 seconds in a Gurley porosity tester.

The vinyl chloride polymer plastisols employed in the process of this invention are conventional except for the fact that they have incorporated therein a water-aminoplast resin solution, a water-phenoplast resin solution or a mixture thereof. The quantity of the water-resin solution employed is sufficient to provide at least 2 parts of water per 100 parts of plastisol and more preferably 5 to 20 parts of water per 100 parts of plastisol.

The water-aminoplast or water-phenoplast resin solutions employed in the invention should contain from about 20 weight percent to about 65 weight percent water and preferably 35–50 weight percent water with the balance being resin. The term "solution" as used herein denotes not only true solutions but also liquid colloidal dispersions of water and resin. As is well-known in the art, aminoplast resins are formaldehyde condensates of amino compounds containing 2 or more amino hydrogen atoms, e.g., urea, thiourea, cyclic ethyleneurea, biuret, dicyandiamid, melamine, acetoguanamine, etc. For a comprehensive description of aminoplast resins of the type which may be employed in this invention see U.S. Patent 2,635,083. Similarly, phenoplast resins are formaldehyde condensates of phenols, such as phenol itself, cresol, resorcinol, naphthol, etc. The preferred embodiment of the invention employs a water-aminoplast resin solution and especially a water-melamine-formaldehyde resin solution.

Vinyl chloride polymer plastisols per se are well-known in the art and as a result are not described herein in detail. In general, such plastisols comprise a dispersion of a finely divided vinyl chloride polymer, e.g., average particle sizes of 0.02–2.0 microns, in a plasticizer therefor. In the usual case, 100 parts of the vinyl chloride polymer are dispersed in from 50 to 200 parts of the plasticizer. In some cases, the plastisol may also contain small quantities of 1 or more volatile organic solvents. Such solvent containing plastisols are sometimes referred to in the art as "organosols." The vinyl chloride polymers employed in the plastisols may be homopolymers of vinyl chloride or copolymers of vinyl chloride with vinyl acetate, vinylidene chloride, acrylate esters, etc. Where copolymers are employed, they should contain at least 50 weight percent of vinyl chloride. The plasticizers employed are usually of the ester type, such as di(2-ethylhexyl) phthalate, dibutyl phthalate, diisodecyl phthalate, tricresyl phosphate, etc. Fillers, stabilizers, colorants, and other conventional plastisol ingredients may be included in the plastisol if desired.

The films of the vinyl chloride polymer plastisols containing the water-aminoplast resin solution or water-phenoplast resin solution can be prepared by conventional film forming methods such as knife coating, spraying, reverse roll coating, calendering, etc. The plastisol films are gelled and converted into a continuous plastic film by heating to temperatures of about 150° C. or above by any conventional heating method such as hot air ovens, infrared heaters, etc. The porous vinyl chloride polymer films can be prepared as unsupported films or may be prepared upon any suitable support such as fabrics, paper, etc.

The porous vinyl chloride films of this invention, either as supported and/or unsupported films, may be employed as upholstering materials, as a bandage packing, etc. and in other applications where an air and/or water vapor permeable plastic film is desired.

The above descriptions and particularly the examples are set forth by way of illustration only. Many other variations and modifications thereof will be apparent to those skilled in the art and can be made without departing from the spirit and scope of the invention herein described.

What is claimed is:

1. In a process for preparing a film of a plasticized vinyl chloride polymer in which a dispersion of a vinyl chloride polymer in a plasticizer therefor is cast into a thin film and fused by heating to a temperature of at least 150° C. at atmospheric pressure; the improvement which comprises incorporating in the dispersion of the vinyl chloride polymer a water-resin solution containing from about 20 weight percent to about 65 weight percent water and the balance a resin from the group consisting of an aminoplast resin, a phenoplast resin and mixtures thereof, the quantity of the water-resin solution included in the dispersion of the vinyl chloride polymer being sufficient to provide 2–20 parts of water per 100 parts of combined vinyl chloride polymer and plasticizer.

2. The method of claim 1 wherein the water-resin solution is a solution of water and a melamine-formaldehyde resin.

3. The method of claim 1 wherein the water-resin solution is a solution of water and a urea-formaldehyde resin.

4. The method of claim 1 wherein the water-resin solution is a solution of water and a phenol-formaldehyde resin.

References Cited in the file of this patent

UNITED STATES PATENTS

| | | |
|---|---|---|
| 2,056,796 | Macht et al. | Oct. 6, 1936 |
| 2,183,857 | Turkington | Dec. 19, 1939 |
| 2,432,389 | Daly | Dec. 9, 1947 |
| 2,447,056 | Cooper | Aug. 17, 1948 |
| 2,559,609 | Foust | July 10, 1951 |
| 2,777,824 | Leeds | Jan. 15, 1957 |
| 2,864,777 | Greenhoe | Dec. 16, 1958 |

FOREIGN PATENTS

| | | |
|---|---|---|
| 500,298 | Great Britain | Feb. 7, 1939 |
| 578,838 | Great Britain | July 15, 1946 |
| 684,878 | Great Britain | Dec. 24, 1952 |
| 685,933 | Great Britain | Jan. 14, 1953 |
| 725,100 | Great Britain | Mar. 2, 1955 |
| 756,555 | Great Britain | Sept. 5, 1956 |

OTHER REFERENCES

British Plastics, March 1956, pp. 86–88.